United States Patent [19]
Takatori et al.

[11] Patent Number: 5,361,328
[45] Date of Patent: Nov. 1, 1994

[54] DATA PROCESSING SYSTEM USING A NEURAL NETWORK

[75] Inventors: Sunao Takatori; Ryohei Kumagai; Koji Matsumoto; Makoto Yamamoto, all of Tokyo, Japan

[73] Assignee: Ezel, Inc., Tokyo, Japan

[21] Appl. No.: 58,035

[22] Filed: May 7, 1993

Related U.S. Application Data

[63] Continuation of Ser. No. 814,230, Dec. 23, 1991, abandoned, which is a continuation of Ser. No. 590,010, Sep. 28, 1990, abandoned.

[30] Foreign Application Priority Data

Sep. 28, 1989 [JP] Japan .................................. 1-253248

[51] Int. Cl.$^5$ ............................................. G06F 15/18
[52] U.S. Cl. .......................................... 395/22; 395/24; 395/21; 382/14
[58] Field of Search ...................... 395/24, 22; 382/14

[56] References Cited

U.S. PATENT DOCUMENTS

| | | | |
|---|---|---|---|
| 3,097,349 | 7/1963 | Putzrath et al. | 340/172.5 |
| 3,165,644 | 1/1965 | Clapper | 340/172.5 |
| 3,250,918 | 5/1966 | McGrogan, Jr. | 307/88.5 |
| 3,284,780 | 11/1966 | Clapper | 340/172.5 |
| 3,287,649 | 11/1966 | Rosenblatt | 328/55 |
| 3,311,895 | 3/1967 | Clapper | 340/172.5 |
| 3,317,900 | 5/1967 | Clapper | 340/172.5 |
| 3,317,901 | 5/1967 | Clapper | 340/172.5 |
| 3,333,249 | 7/1967 | Clapper | 340/172.5 |
| 3,533,072 | 10/1970 | Clapper | 340/172.5 |
| 3,568,075 | 3/1971 | Dusbeck et al. | 328/146 |
| 3,599,009 | 8/1971 | Parmentier et al. | 307/201 |
| 3,601,811 | 8/1971 | Yoshino | 340/172.5 |
| 3,602,888 | 8/1971 | Nishiyama et al. | 340/172.5 |
| 3,638,196 | 1/1972 | Nishiyama et al. | 340/172.5 |
| 3,691,400 | 9/1972 | Askew | 307/201 |
| 3,701,974 | 10/1972 | Russell | 340/172.5 |
| 3,950,733 | 4/1976 | Cooper et al. | 340/172.5 |
| 4,044,243 | 8/1977 | Cooper et al. | 235/152 |
| 4,163,983 | 8/1979 | Cline et al. | 357/12 |
| 4,254,474 | 3/1981 | Cooper et al. | 364/900 |
| 4,319,331 | 3/1982 | Elbaum et al. | 364/515 |
| 4,326,259 | 4/1982 | Cooper et al. | 364/715 |
| 4,450,530 | 5/1984 | Llinas et al. | 364/513 |
| 4,518,866 | 5/1985 | Clymer | 307/201 |
| 4,716,540 | 12/1987 | Yamakawa | 364/807 |
| 4,737,929 | 4/1988 | Denker | 364/807 |
| 4,739,496 | 4/1988 | Marom et al. | 365/125 |
| 4,748,674 | 5/1988 | Freeman | 382/14 |
| 4,750,153 | 6/1988 | Owechko et al. | 365/125 |
| 4,752,906 | 6/1988 | Kleinfeld | 364/807 |
| 4,760,437 | 7/1988 | Denker et al. | 357/30 |
| 4,760,604 | 7/1988 | Cooper et al. | 382/15 |
| 4,762,397 | 8/1988 | Pepper | 350/331 R |
| 4,766,568 | 8/1988 | McGregor et al. | 365/49 |
| 4,773,024 | 9/1988 | Faggin et al. | 364/513 |
| 4,774,677 | 9/1988 | Buckley | 364/513 |
| 4,792,460 | 12/1988 | Chu et al. | 427/35 |
| 4,792,915 | 12/1988 | Adams et al. | 364/724.19 |
| 4,796,199 | 1/1989 | Hammerstrom et al. | 364/513 |
| 4,799,149 | 1/1989 | Wolf | 364/200 |
| 4,800,519 | 1/1989 | Grinberg et al. | 364/822 |
| 4,802,103 | 1/1989 | Faggin et al. | 364/513 |
| 4,803,736 | 2/1989 | Grossberg et al. | 382/22 |
| 4,805,225 | 2/1989 | Clark | 382/15 |
| 4,807,168 | 2/1989 | Moopenn et al. | 364/602 |
| 4,809,193 | 2/1989 | Jourjine | 364/513 |
| 5,067,164 | 11/1991 | Denker et al. | 382/15 |

OTHER PUBLICATIONS

Vidal, J. J., "Implementing Neural Nets with Programmable Logic" IEEE Transactions on Acoustics, Speech and Signal Processing, Jul. 1988, 1180–1190.

Linsker, R., "From Basic Network Principles to Neural Architecture: Emergence of Orientation Columns", Proc. Natl. Acad. Sci., Nov. 1986, vol. 83, pp. 8779–8783.

(List continued on next page.)

*Primary Examiner*—Robert W. Downs
*Attorney, Agent, or Firm*—Cushman, Darby & Cushman

[57] ABSTRACT

A data processing system comprising a plurality of neural layers characterized in that a part of neurons in one of the layers are connected to neurons in the following layer.

6 Claims, 11 Drawing Sheets

OTHER PUBLICATIONS

Mueller et al., "Neural Computation of Visual Images," IEEE First Intl Conf. on Neural Networks, Jun. 1987, IV 75–88.

Fukushima, K., "Self-organizing Neural Network Models for Visual Pattern Recognition", Acta Neurochirurgia, 1987, 51–67.

Moody et al., "Learning with Localized Receptive Fields", Proc. of the 1988 Connectionist Models Summer School, 1988, 133–143.

Cortes et al., "A Network System for Image Segmentation", Intl. Joint Conf. on Neural Networks, 1989, I-12-1–I-125.

Le Cun et al., "Handwritten Digit Recognition: Applications of Neural Network Chips and Automatic Learning", IEEE Communications Mag., Nov. 1989, 41–46.

Mozer et al., "Skeletonization: A Technique for Trimming the Fat from a Network Via Relevance Assessment", Adv. in Neural Info. Processing Systems 1, 1989, 107–115.

Lippmann, "An Introduction to Computing with Neural Nets", *IEEE ASSP Magazine, Apr. 1987, pp. 4–22.*

Rosenfeld et al. "Digital Picture Processing", Second Edition, vol. 1, pp. 4–6 and 206–210.

Rosenblatt, "The Perceptron: A Probabilistic Model for Information Storage and Organization in the Brain", Psyhological Review 65:386–408, pp. 89–114.

DATA PROCESSING SYSTEM USING A NEURAL NETWORK

This is a continuation of application Ser. No. 07/814,230, filed on Dec. 23, 1991, which was abandoned upon the filing hereof, which is a continuation division of application Ser. No. 07/590,010, filed on Sep. 28, 1990, which was abandoned upon the filing hereof.

FIELD OF THE INVENTION

The present invention relates to a data processing system based on a neural network.

PRIOR ART

The neural network in a neural network kind of data processing system is constructed in a layer style using neuron model in FIG. 6 in a parallel architecture as shown in FIG. 7. As to neuron 1, data DI1, DI2, DI3, ..., DIn inputted from outside are multiplied by the weights W1, W2, W3, ..., Wn, respectively. Data D0 is outputted according to the comparison between the sum of the products and threshold $\Theta$. Though it is possible to use various kinds of methods to compare, it is settled that output data D$\Theta$ becomes "1" when the sum is greater than or equal to a threshold $\Theta$, and that D$\Theta$ become "0" when the sum is less than threshold $\Theta$.

Conventional neural networks construct the neural layer by setting neurons in parallel. Simultaneously, it is constructed by connecting the neural layers in series: the neuron in each layer is connected to all neurons in adjacent layers.

SUMMARY OF THE INVENTION

As numerous neurons are in each layer, the number of connectedness becomes enormous by connecting a neuron to all neurons in adjacent layers. Consequently, a data processing system constructed by such neural network becomes very large.

The present invention is invented so as to solve the above problems of the prior art and has an object to execute a data processing system that has a small size by limiting the number of connectedness between neurons.

A data processing system according to the present invention is characterized in that a neuron in a layer in a middle step of a layer between the first neural layer and the last neural layer is connected to only a part of the neurons in adjacent layers.

BRIEF DESCRIPTION OF THE DRAWINGS

FIG. 1 (b) shows a diagram of the second embodiment of a data processing system.

FIG. 1 (c) shows a diagram of the third embodiment of a data processing system.

FIG. 2 (b) shows a diagram of the fifth embodiment of a data processing system.

FIG. 2 (c) shows a diagram of the sixth embodiment of a data processing system.

FIG. 3 (b) shows a diagram of the eighth embodiment of a data processing system.

FIG. 3 (c) shows a diagram of the ninth embodiment of a data processing system.

FIG. 4 (b) shows a diagram of the eleventh embodiment of a data processing system.

FIG. 4 (c) shows a diagram of the twelfth embodiment of a data processing system.

PREFERRED EMBODIMENT OF THE PRESENT INVENTION

Hereinafter, an embodiment of the data processing system according to the present invention is described with referring to the attached drawings.

Figure 8:
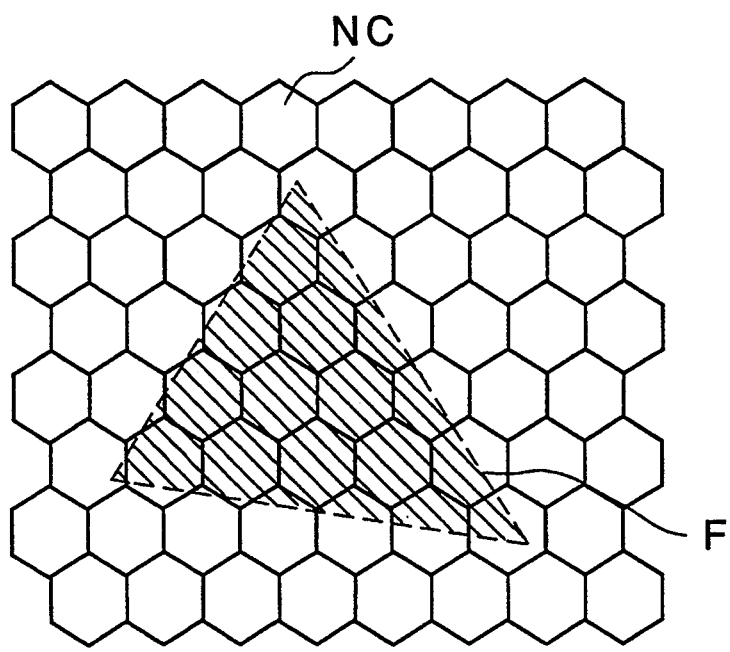
FIG. 8 shows neural cells.

In FIG. 8, a data processing system comprises plural neural cells labelled NC, which are formed in a hexagonal configuration, forming a honeycombed style as a whole.

Usually, in image processing, processing is performed by dividing an image into units of area. Each unit of area is an area of a square or a rectangle of 3×3 pixels or so. This limited area is caused by the restriction of hardware for scanning an image. The best way to use these units of area is to share the boundary of a unit with other units, such that the areas are in peripheral relation to one another. A honeycombed structure, however, provides a more advantageous processing condition. For example, since the structure of a neural layer can be set independent of the image scanning hardware, desired units of area can be set. It is, therefore, possible to adapt the style of processing by setting different units of area on the neural network side, not in the input system. Digital pixel data is inputted to a data processing system through the input system. In FIG. 8, triangle F is shown as inputted to the data processing system.

Figure 9:
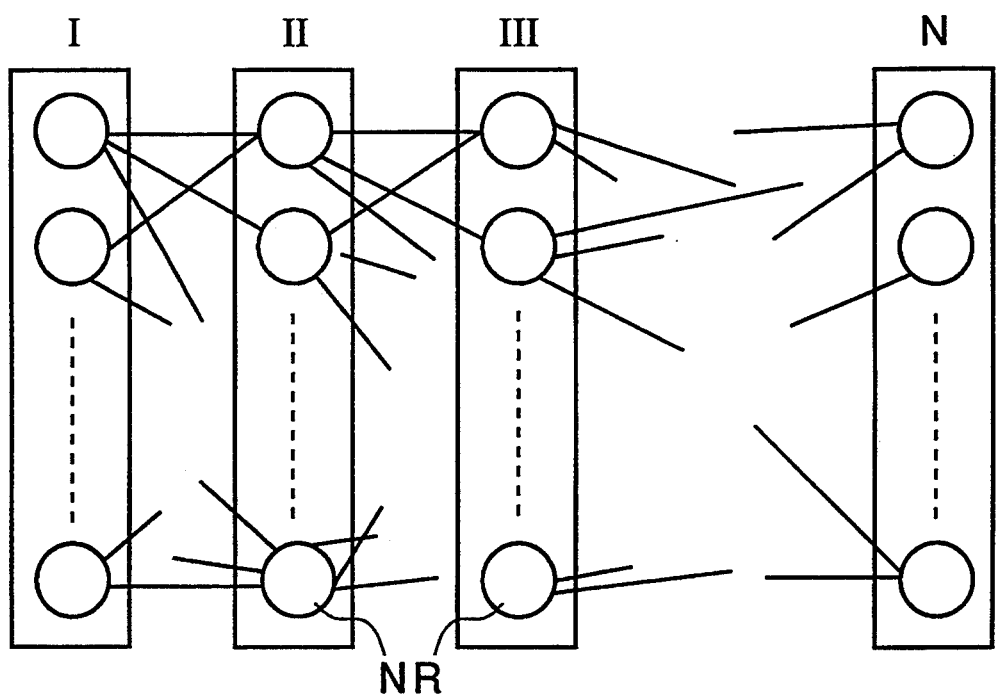
FIG. 9 shows the layers of neural cells in FIG. 8.

Each neural cell NC comprises plural neural layers (FIG. 9), which is constructed by settling plural neurons N in parallel. Namely, FIG. 9 shows the structure of a neural cell. In this example, neuron NR in each neural layer is connected to all neurons NR in adjacent neural layers. An output of the n-th neural layer becomes an input of (N+1)th neural layer. The inputted data is processed by each neural layer sequentially, enabling the last output to be obtained.

Figure 10:
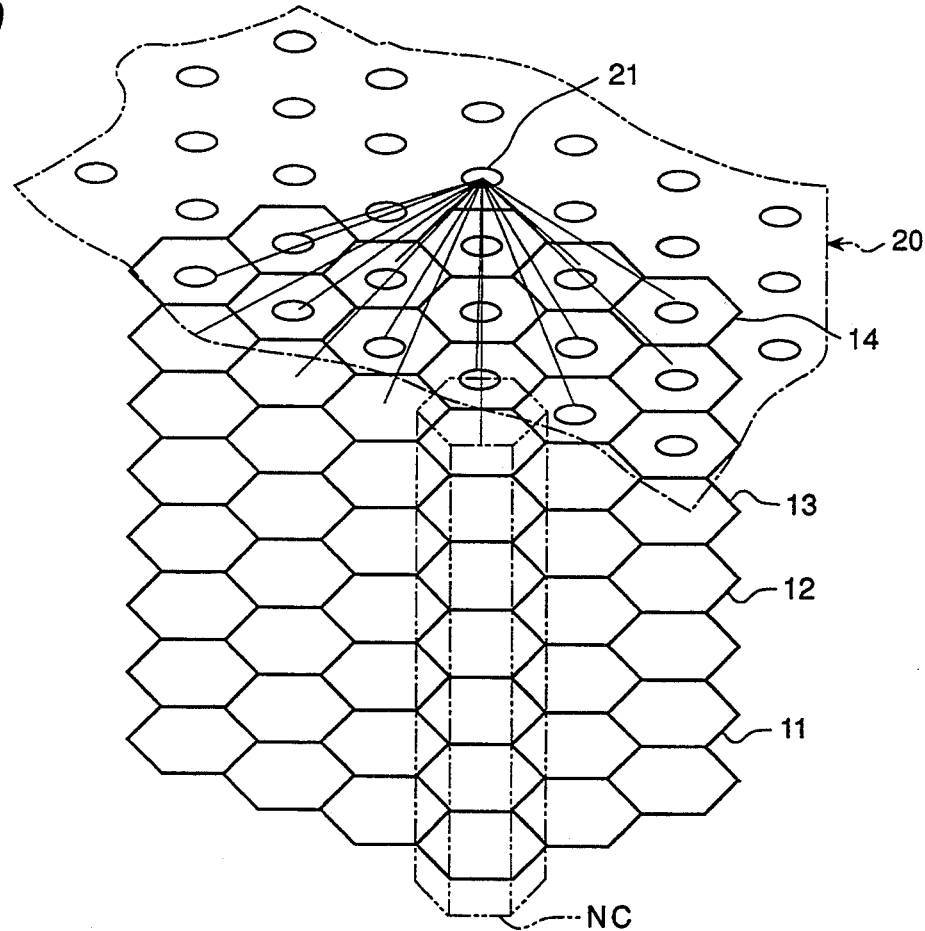
FIG. 10 shows the structure of neural cells and that of neural layer for the post-processing.

FIG. 10 shows the relationship among neural layers 11, 12, 13, 14 and 20 as a model showing a plurality of hexagonal cells: neural layer 20 is for neural cells and post-processing (It is described later with referring to FIG. 16.).

In FIG. 10, plural neural layers 11, 12, 13 and 14 are divided into hexagonal neural cells NC. That is, each neural cell NC comprises plural neural layer 11, 12, 13 and 14, each of which neural layers comprise numerical neurons for processing data, respectively. In each neural cell NC, a neuron is connected to a neuron in adjacent neural layers but not connected to a neuron in other neural cells NC. Neural cells NC are not connected to each other: data is given and received in only one neural cell. Neural cell NC is not necessary to include all neural layers constructing data processing systems: it can be adapted by setting neural cell NC in only two neural layers, for instance.

The data processing system can possess a processing function which varies according to the object by learning. The case for recognizing a simple geometric diagram is explained below.

Figure 11:
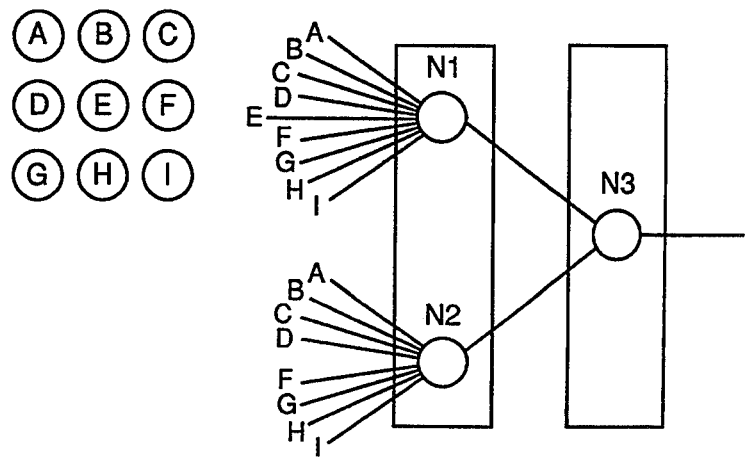
FIG. 11 shows an edge extracting processing system of neural cells in FIG. 10.

An example of a neural network used to extract an edge is shown in FIG. 11. In FIG. 11, neurons from A to I for 3×3 pixels are shown. These neurons generate output "1" for an input of high brightness. Assuming the outputs of neurons from A to I to be A to I, the existence of the edge except the isolated point can be expressed in formula (1).

$$\overline{E}(A+B+C+D+F+G+H+I)$$
$$(A+B+C+D+F+G+H+I)=1 \tag{1}$$

Outputs from A to I are inputted to neuron N1, and outputs from A to D and F to I are inputted to neuron N2. Outputs of neurons N1 and N2 are inputted to neuron N3. For example, the weights of neurons from N1 to N3 and threshold are settled as shown in table 1 to 3.

TABLE 1

Weights and Threshold of Neuron N1

| Weights to output A | W1A | −1 |
|---|---|---|
| Weights to output B | W1B | −1 |
| Weights to output C | W1C | −1 |
| Weights to output D | W1D | −1 |
| Weights to output E | W1E | 9 |
| Weights to output F | W1F | −1 |
| Weights to output G | W1G | −1 |
| Weights to output H | W1H | −1 |
| Weights to output I | W1I | −1 |
| Threshold $\theta$ | $\theta 1$ | 0.5 |

TABLE 2

Weights and Threshold of Neuron N2

| Weights to output A | W2A | −1 |
|---|---|---|
| Weights to output B | W2B | −1 |
| Weights to output C | W2C | −1 |
| Weights to output D | W2D | −1 |
| Weights to output F | W2F | −1 |
| Weights to output G | W2G | −1 |
| Weights to output H | W2H | −1 |
| Weights to output I | W2I | −1 |
| Threshold $\theta$ | $\theta 2$ | 0.5 |

TABLE 3

Weights and Threshold of Neuron N3

| Weights to output N1 | W3N1 | 1 |
|---|---|---|
| Weights to output N2 | W2N2 | 1 |
| Threshold $\theta$ | | 1.5 |

Neuron N1 performs the processing according to formula (2).

$$\overline{E}(A+B+C+D+F+G+H+I) \tag{2}$$

Neuron N2 performs the processing according to formula (3).

$$A+B+C+D+F+G+H+I \tag{3}$$

Neuron N3 corresponds to an AND logic between formulas (2) and (3).

Therefore, neuron N3 generates an output "1" when an edge of a diagram is projected in neuron E.

Figure 12:
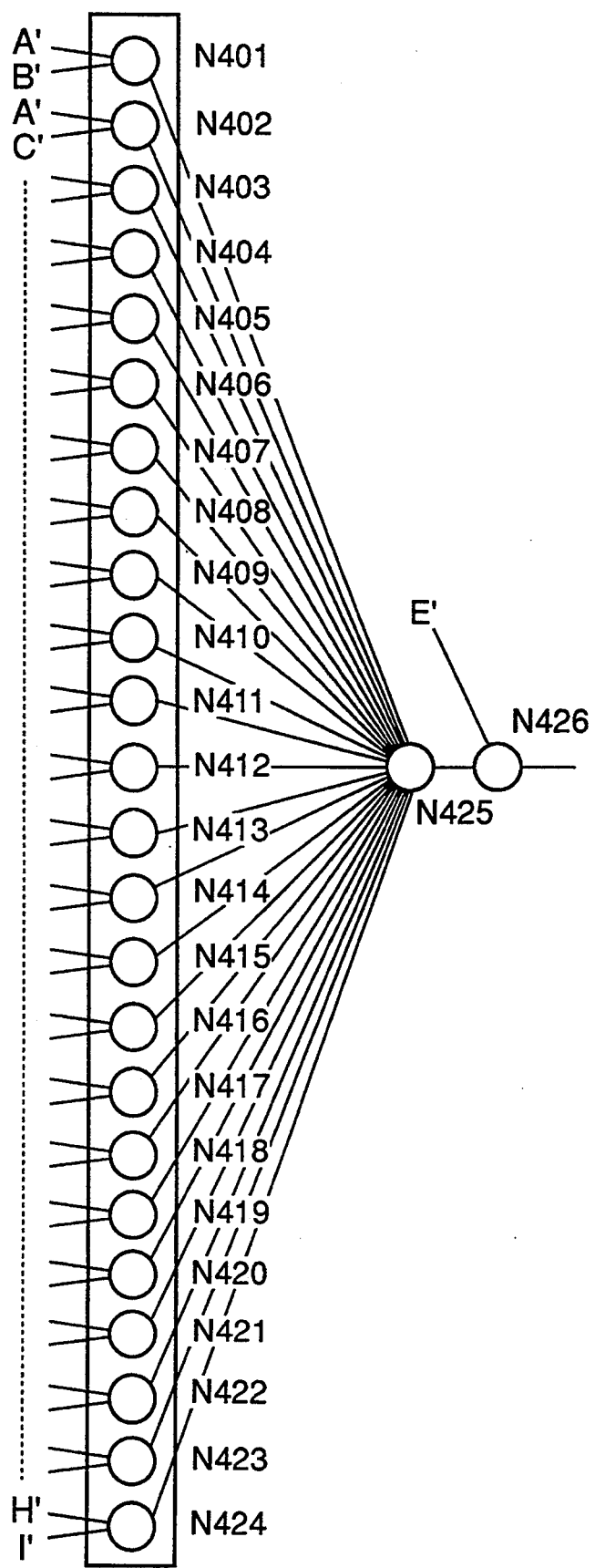
FIG. 12 is a diagram of a corner extracting processing system of neural cells in FIG. 10.

An example of a neural network to extract a corner is explained below according to FIG. 12. The input of the neural network is the output of neuron N3 in FIG. 11. In FIG. 12, neurons N3 of A' to I' corresponding to neurons from A to I are indicated. The logic to extract the corner is as in formula (4).

$$\overline{E'}(A'B'+A'C'+A'D'+A'F'+A'G'+A'H'+B'C'+B'D'+ \\ B'F'+B'G'+B'I'+C'D'+C'F'+C'H'+C'I'+D'G'+D'H'+ \\ D'I'+F'G'+F'H'+F'I'+G'H'+G'I'+H'I')=1 \tag{4}$$

Neurons from N401 to N424 and N425 are set for the processing Outputs of A' to D', F' to I' are inputted to neurons N401 to N424 with the combination shown in Table 4. The weights and thresholds corresponding to these inputs are as in the table.

TABLE 4

| Neuron | Input | Weight | Threshold |
|---|---|---|---|
| N401 | A'B' | 1 | 1.5 |
| N402 | A'C' | 1 | 1.5 |
| N403 | A'D' | 1 | 1.5 |
| N404 | A'F' | 1 | 1.5 |
| N405 | A'G' | 1 | 1.5 |
| N406 | A'H' | 1 | 1.5 |
| N407 | B'C' | 1 | 1.5 |
| N408 | B'D' | 1 | 1.5 |
| N409 | B'F' | 1 | 1.5 |
| N410 | B'G' | 1 | 1.5 |
| N411 | B'I' | 1 | 1.5 |
| N412 | C'D' | 1 | 1.5 |
| N413 | C'F' | 1 | 1.5 |
| N414 | C'H' | 1 | 1.5 |
| N415 | C'I' | 1 | 1.5 |
| N416 | D'G' | 1 | 1.5 |
| N417 | D'H' | 1 | 1.5 |
| N418 | D'I' | 1 | 1.5 |
| N419 | F'G' | 1 | 1.5 |
| N420 | F'H' | 1 | 1.5 |
| N421 | F'I' | 1 | 1.5 |
| N422 | G'H' | 1 | 1.5 |
| N423 | G'I' | 1 | 1.5 |
| N424 | H'I' | 1 | 1.5 |

Output from N401 to N424 are inputted to neuron N425. Its weight and threshold are shown in Table 5.

TABLE 5

| Neuron | Weight | Threshold |
|---|---|---|
| From N401 to N424 | 1 | 1.5 |

This is equivalent to an OR logic.

The output of neuron N425 and E' are inputted to neuron N426. Their weights and thresholds are settled as in Table 6.

TABLE 6

| Neuron | Weight | Threshold |
| --- | --- | --- |
| N425 | 1 | 1.5 |
| N424 | 1 | |

This is equivalent to an AND logic.

Figure 13:
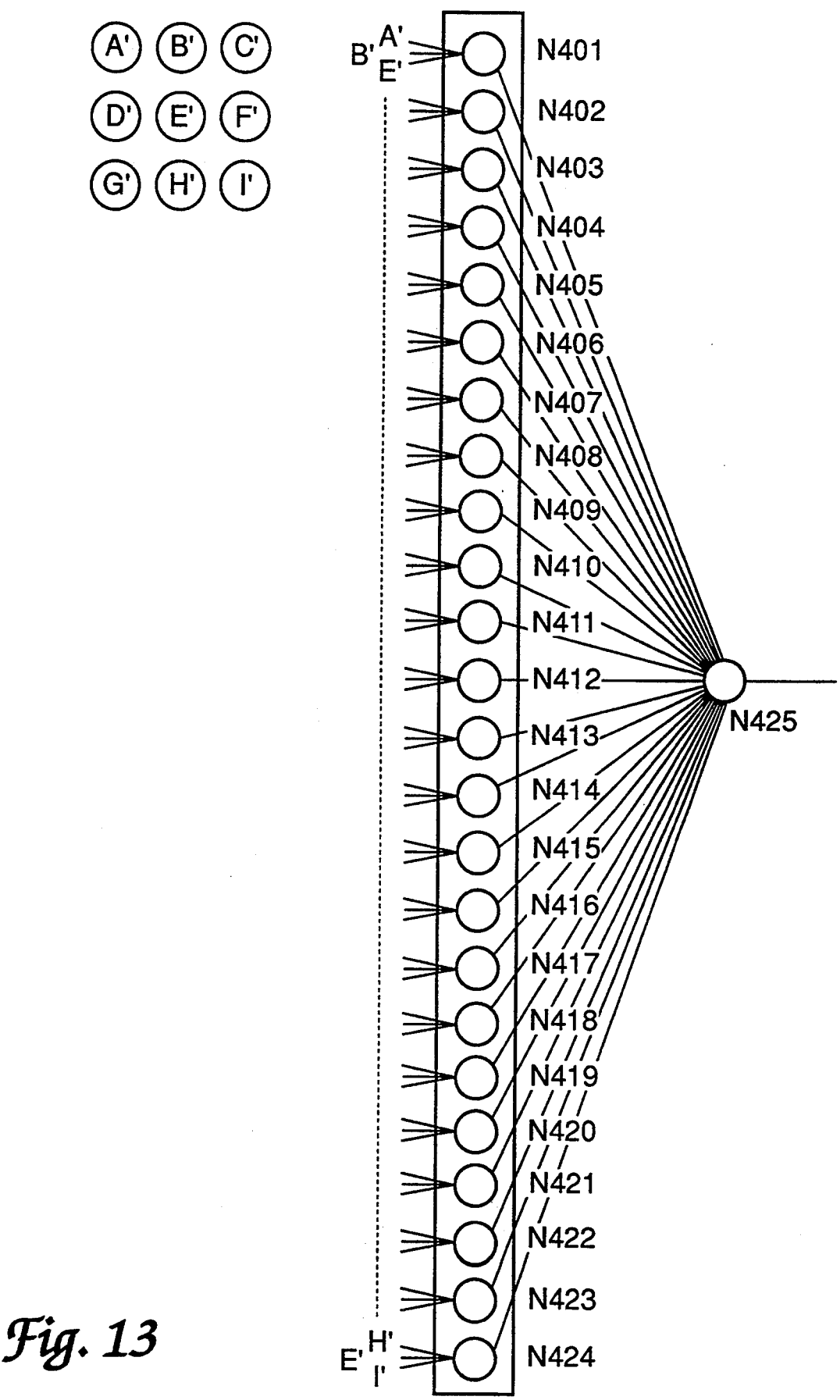
FIG. 13 shows a diagram of a variation of FIG. 11.

Settlement of above weights are executed automatically by learning in a data processing system, and the most appropriate association can be executed by suitable learning. By deciding in advance to which layer each data is to be inputted, the action of the neuron can be made more efficient. For example, as to the neural network in FIG. 5, when data E' is inputted with A' to D' and F' to I' simultaneously to the first neural layer, a neural network with the same function of the one in FIG. 11 can be constructed (FIG. 13). In this case, the number of layers can be decreased by one layer, but the number of synapses in the first neural layer is increased by 24 and the number of connecting lines increases remarkably. This can be translated into levels of abstraction. As input E' acts on the result of logic computation (A'B' + ... ), it has the same level of abstraction as the logic computation in the parentheses. The action of a neuron becomes more efficient if input to the layer according to its abstraction.

Introducing the concept of degrees to abstraction of data, the definitions below are considered.

1. Degree becomes higher by one by the processing of one neural layer.
2. An input to the same neural layer has the same degree.

According to these definitions, the necessary number of neural layers is 4 (when the structures in FIG. 11 and FIG. 13 are adopted) or 5 (when the structures in FIG. 11 and FIG. 12 are adopted). Assuming the degrees of pixel data (inputs to neurons from A to I) to be 0, the degree of the last output is 4 or 5.

Figure 14:
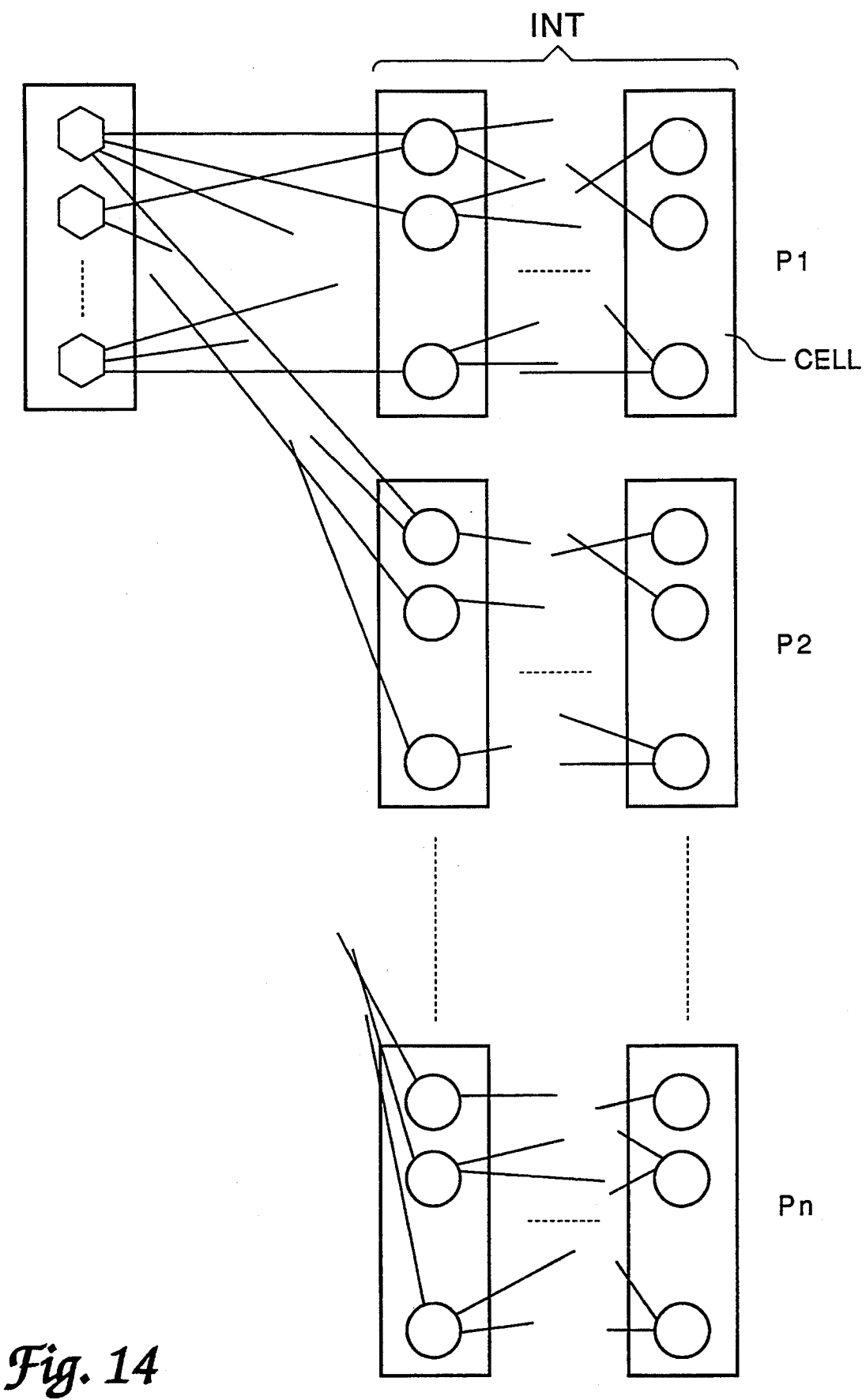
FIG. 14 shows a diagram of an integration processing system in later step of neural processing system.

The output is analyzed to determine if edge or corner are detected is generated in every neural cell using the processing discussed above. The judging output is inputted to the neural layer group for integration INT as shown in FIG. 14. It can be said that the data to be processed in neural layer group INT has a higher degree than that in the neural layer above.

Neural layer group INT comprises plural processing systems from P1 to Pn, each of which has a layer structure of plural neural layers. Processing systems from P1 to Pn are classified according to, for example, the figure. For instance, P1 takes part in triangles, P2 takes part in rectangles, . . . Pn takes part in figures with (n+2) sides.

The output from the neural cell in the above is the signal to show the existence or non-existence of an edge in the neural cell ("ES", hereinafter) and the signal to show the existence of corner ("CS", hereinafter). However, pseudo-corners like x1 and x2 may be generated on a side by irregularity of a figure itself or noise even on a simple triangle.

Figure 15:
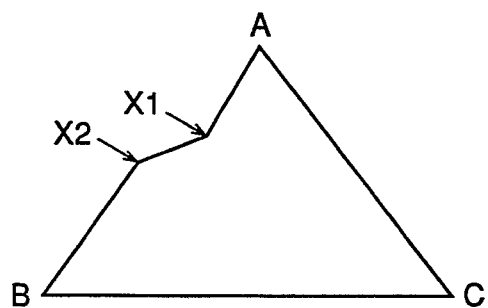
FIG. 15 is a diagram to show pseudo-corners in a figure.

As for the processing system for a triangle, such an incorrect corner signal is removed, original corners A, B and C are emphasized, and coordinate values, etc. are outputted. FIG. 15 can be used for a neural network to delete the emphasis of corner A, B and C, and pseudo-corners.

Figure 16:
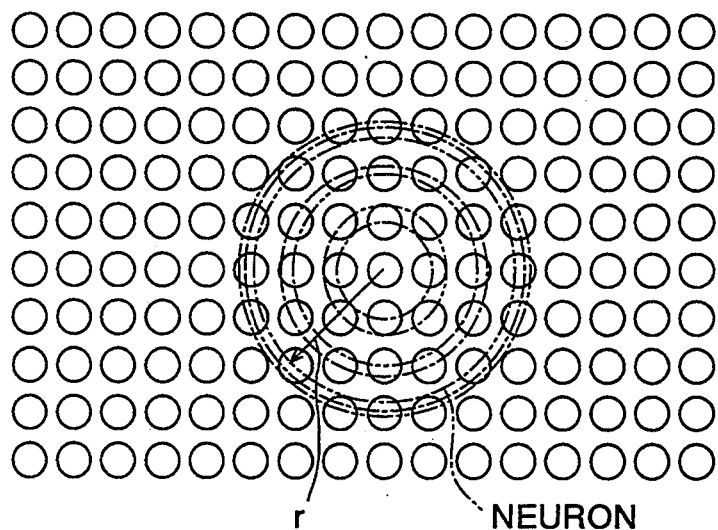
FIG. 16 is a diagram to show the relationship among neurons in plane.

The neural network in FIG. 16 comprises a neuron corresponding to the neural cell NC. Each neuron is connected to all neural cells NC as neuron 21 in FIG. 10. The weight of each neuron is the maximum for the input of its corresponding neural cell CS, minus weight of maximal absolute value for peripheral neural cells of its corresponding neural cell, and more distant, more weighted. This relationship is expressed in the graph of FIG. 17.

Figure 17:
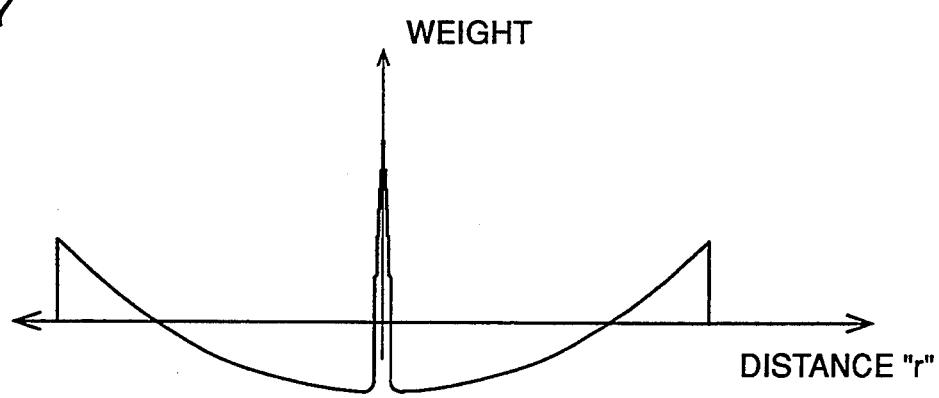
FIG. 17 is a diagram to show the relationship between distance and weight of neurons.

The corner signals of pseudo-corner generated on a side is weakened and those of corners A, B, and C are emphasized. In FIG. 17, though the relationship between distance and weight has approximately a secondary curve, other monotonous increasing curves can be adopted.

Rosenblatt's "Perceptrons" suggests the structure to perform emphasizing contour of an ignition pattern by giving the connection of restraint-type to feed-back system which is from reaction layer to union layer, but there is no suggestion concerning feed-forward-like connection of restraint type.

The data to be given to each processing system of neural layer INT is the one abstracted in the neural cell. That is, a higher degree of data is given to each processing system of a neural layer INT. When an image processing system with the ability to abstract the data of a corner and edge is used as an input system, data can be inputted to INT of a neural layer group. When pixel data and characteristics data coexist together, the neuron action can be more efficient by inputting a higher degree of data, like corner data, into the neural layer in a later step. Calculating beforehand the difference of degrees between input data and the data to be finally outputted, a minimum number of neural layers can be obtained: namely, the expected object can be achieved.

According to the data processing system of the present invention, neurons adjacent to one another are not combined in settled parts as described later referring to FIG. 1 to FIG. 4. The number of connectedness of neurons of one another—that is, the number of synapses—is controlled to be the minimum.

Figure 1A:
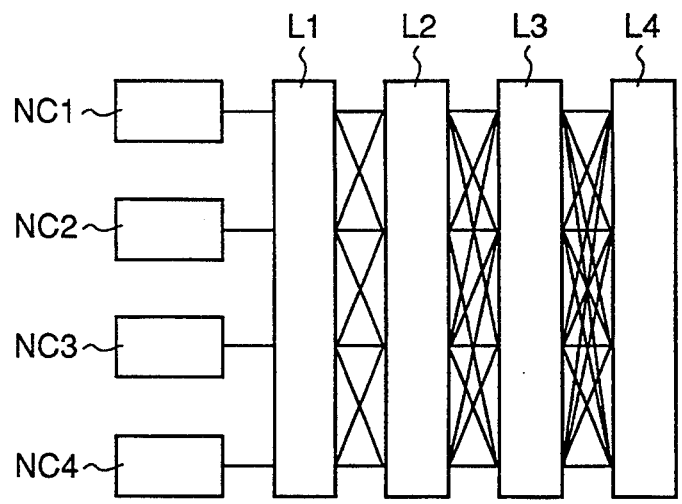
FIG. 1 (a) shows a diagram of the first embodiment of a data processing system.
Figure 1B:
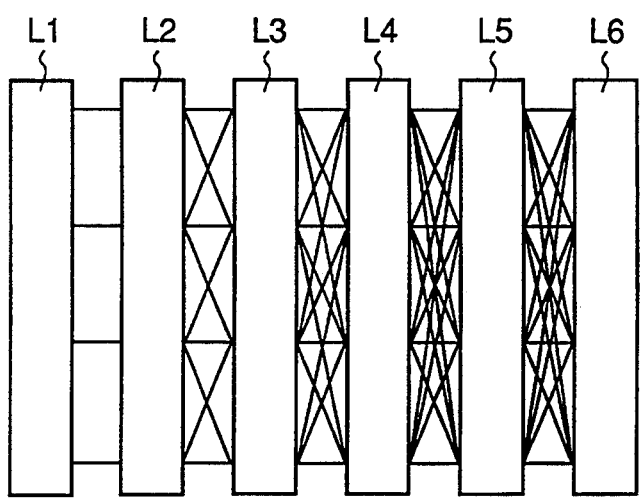
Figure 1C:
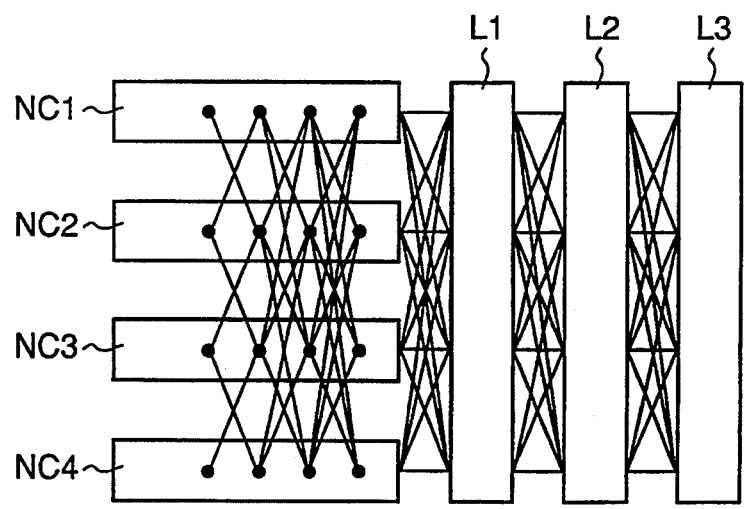

FIG. 1 (a) shows the first embodiment. The data processing system in this embodiment comprises neural cells from NC1 to NC4 on the input side, that is on the first step, and neural layers from L1 to L4 on output side, that is the later steps. A neural cell comprises plural neural layers, as explained referring to FIG. 9, and each neural layer comprises plural neurons. A neuron in each neural layer is connected to the all neurons in adjacent neural layers, but is not connected to the neurons which comprise other neural cells. In other words, neural cells from NC1 to NC4 are individual and data is not given or received to or from one another.

Neural cells from NC1 to NC4 are connected to neural layer L1. Neural layers L1 to L4 are connected by only the neurons adjacent each other. The neurons in neural cells from NC1 to NC4 are connected to only a part of the neurons in neural layer L1, and the neurons in neural layer L1 are connected to a part of neurons in neural layer L2. The number of connectedness of neurons between neural layer L1 and L2 is more than that between neural layer L1 and neural cells from NC1 to NC4. In the same way, the neurons in neural layer L2 are connected to a part of neurons in neural layer L3: and the number of connectedness layer between L2 and L3 is more than that between neural layer L1 and L2. The neurons in neural layer L3 are connected to all of the neurons in neural layer L4. The number of connectedness between neural layers is increased at later steps of the neural layers.

Such a structure where the number of connectedness increases at later steps of neural layer is effective when it is necessary to input neurons to a lot of neurons in adjacent neural layers, for example, the case that the information processed and divided is integrated efficiently, because the relationship between data to be outputted to each neuron itself becomes closer at later steps although it is not close in earlier steps of the neural layer. The connectedness between neurons with no reflection to data processing is omitted, and thus it is possible to control the number of connectedness to be minimum and data processing system can be miniaturized.

FIG. 1 (b) shows the second embodiment. Data processing system does not comprise neural cells but comprises neural layers from L1 to L6. Neurons in neural layer L1 are connected to a part of neurons in neural layer L2. Likewise, neurons in neural layer L2 are connected to a part of neurons in neural layer L3: the number of connectedness is more than that between neural layer L1 and L2. Neurons in neural layer L3 is connected to a part of neurons in neural layer L4: the number of connectedness is more than that of the previous one. Neurons in neural layer L4 are connected to all of neurons in neural layer L5 and neurons in neural layer L5 are connected to all of neurons in neural layer L6.

Also in this example, the number of connectedness of neurons between each neural layer increases as later steps.

Therefore, the second embodiment is also effective in the case that the relationship between data outputted from neurons becomes closer as later steps. The number of connectedness can be controlled to be minimum and the data processing system can be miniaturized by omitting the connections between neurons with no reflection to data processing.

FIG. 1 (c) shows the third embodiment. The data processing system according to this embodiment comprises neural cells from NC1 to NC4 and neural layers from L1 to L3. Neurons in each neural cell are connected to a part of neurons of the elements of other neural cells, differentiating this from the connection in FIG. 1 (a). The neurons in each neural cell are divided completely from other neurons in other neural cells, but connected to a part of neurons in another neural cell in later step: the number of connectedness is increased as later step.

As to the neurons in neural layers from L1 to L3, each neuron is connected to all neurons in adjacent neural layers.

Adopting this structure, the number of connectedness can be controlled to be minimum and data processing system can be miniaturized by omitting the connections between neurons with no reflection to data processing, even when neurons in a neural cell have mutual relationship and are connected each other in a later step.

Figure 2A:
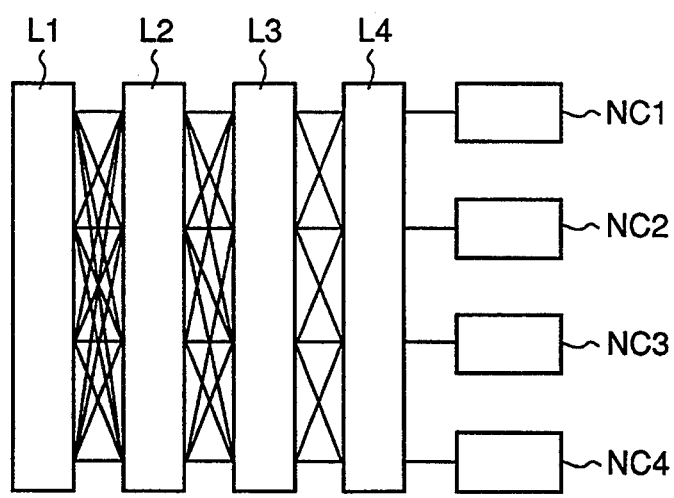
FIG. 2 (a) shows a diagram of the fourth embodiment of a data processing system.
Figure 2B:
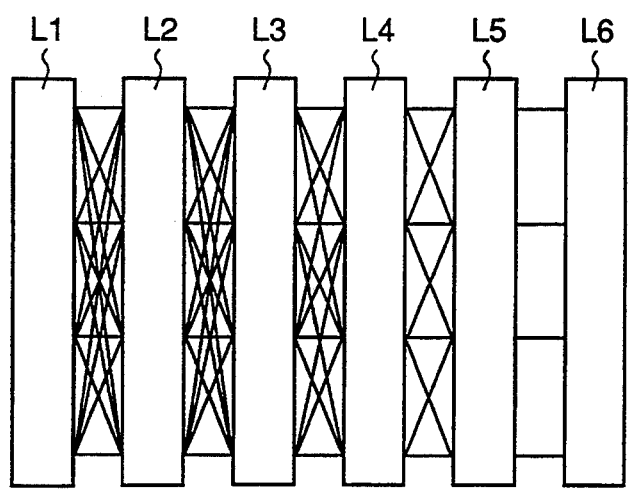
Figure 2C:
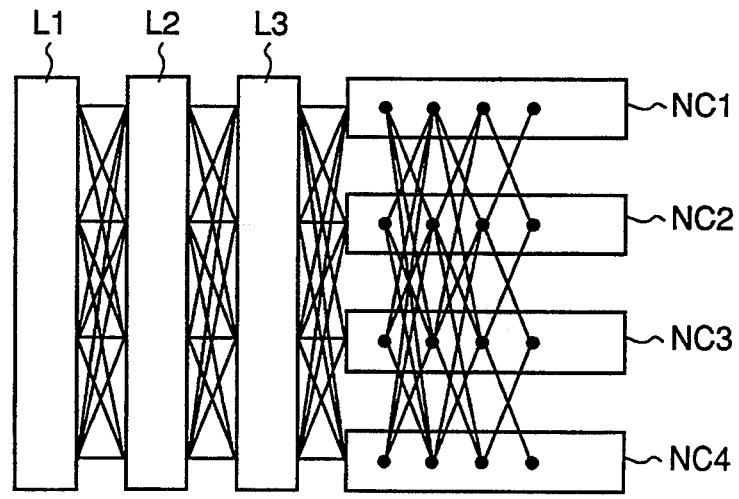

FIG. 2 (a) to 2 (c) shows the structure where elements nearer to the output side—that is, later steps—have a less number of connectedness of neurons that is, the opposite of FIG. 1 (a) to (c).

FIG. 2 (a) shows the fourth embodiment. The data processing system in this embodiment comprises neural layers from L1 to L4 on the input side and neural cells from NC1 to NC4 on the output side. The neural cell comprises plural neural layers in the same way as in the first embodiment. The neuron in each neural layer is connected to all the neurons in adjacent neural layers but is not connected to the neurons in other neural cells.

Neural layers from L1 to L4 are connected to each other by the neurons in adjacent layers. The last step of neural layer L4 is connected to neural cells NC1 and NC2. Each neuron in neural layer L1 is connected to all the neurons in neural layer L2, whose neurons are connected to only a part of neurons in neural layer L3. Likewise, the neurons in neural layer L3 are connected to only a part of neurons in neural layer L4. The number of connectedness between each neural layer decreases as later step.

This structure that the number of connectedness decreases as later step is effective in the case that the relationship between data to be outputted is close but becomes weak as later steps and it is not necessary for the data to be inputted to many neurons in adjacent neural layer; for example, in the case that plural independent parameters are outputted, which are inputted to separate control system. The connection between neurons with no reflection to data processing is omitted. Therefore, the number of connectedness can be controlled minimum and it is possible to miniaturize data processing system.

FIG. 2 (b) shows the fifth embodiment. The data processing system does not comprise neural cells but comprises neural layers from L1 to L6. The neurons in neural layer L1 are connected to all the neurons in neural layer L2, whose neurons are connected to all the neurons in neural layer L3. The neurons in neural layer L3, L4 and L5 are connected to a part of neurons in neural layer L4, L5 and L6, respectively.

Also in this embodiment, the number of connectedness of neurons between respective neural layers decreases as later step, and this is effective in the case that the relationship between data to be outputted becomes weak as later steps. It is possible to control the number of connectedness to be minimum and to miniaturize a data processing system by omitting the connection between neurons with no reflection to data processing. Comparing to the embodiment in FIG. 2 (a), the present embodiment can separate parameters while decreasing the number of layers and synapses because the separation of independent parameters is executed gradually.

FIG. 2 (c) shows the sixth embodiment. The data processing system in this embodiment comprises neural layers from L1 to L3 and neural cells from NC1 to NC4. Differently from FIG. 2 (a), neurons in a neural cell are connected to a part of the neurons in another neural cell. The neurons in a neural cell are connected to neurons in another neural cell. The number of connectedness decreases as later step and in the last step, they are not be connected to neurons in other neural cells. On the other hand, each neuron in neural layers from L1 to L3 is connected to all the neurons in adjacent neural layers.

Therefore, if neurons in a neural cell are connected in the previous step, the number of connectedness can be controlled to be minimum and the data processing system can be miniaturized by omitting the connectedness between neurons with no reflection to data processing, in the same way in FIG. 2 (b).

Figure 3A:
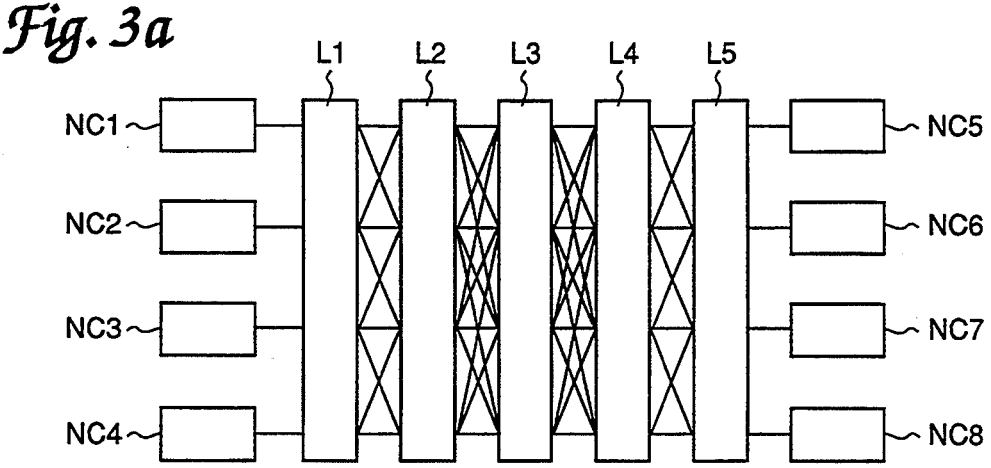
FIG. 3 (a) shows a diagram of the seventh embodiment of a data processing system.
Figure 3B:
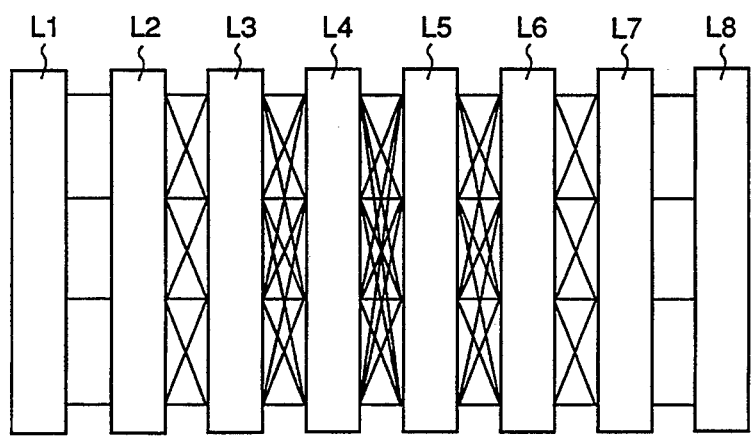
Figure 3C:
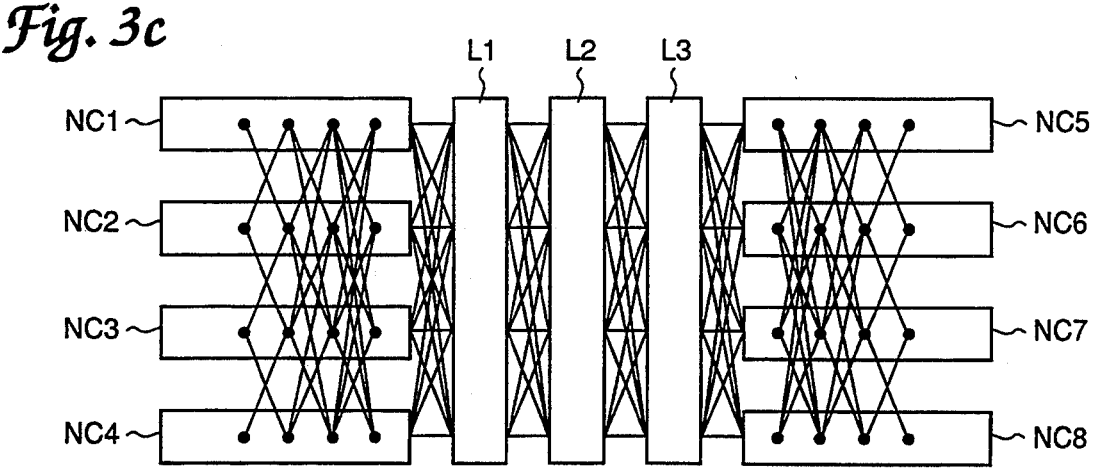

FIG. 3 (a) shows the seventh embodiment. The data processing system in this embodiment comprises neural cells from NC1 to NC4 in input side, from NC5 to NC8 in output side, and neural layers from L1 to L5 in the middle. Neural cells from NC1 to NC8 have the same structure as the first and fourth embodiments. That is, neural cells from NC1 to NC4 are separated from each other and the neurons in them are not connected to others in other neural cells.

Neural cells from NC1 to NC4 are connected to neural layer L1 and from NC5 to NC8 are connected to neural layer L5. Neural layers from L1 to L5 are connected to each other of adjacent layers. The neurons in neural cells from NC1 to NC4 are connected to only a part of neurons in neural layer L1, and also the neurons in neural layer L1 are connected to only a part of neurons in neural layer L2. The number of connectedness between neural layers L1 and L2 is more than that between neural cells from NC1 to NC4 and neural layer L1. In the same way, neurons in neural layer L2 are connected to only a part of neurons in neural layer L3: the number of connectedness is more than that between neural layer L1 and L2. Up to here, the number of connectedness of neurons increases as later step. The number of connectedness between neural layers L3 and L4 is the same as that between neural layers L2 and L3. The number of connectedness of neurons between neural layers L4 and L5 is less than that between L3 and L4. The number of connectedness of neurons between neural layer L5 and neural cells from NC5 to NC8 is further less than that between neural layers L4 and L5.

In the present embodiment, the number of connectedness in the neighborhood of the first step increases as later step, and that in the neighborhood of the last step decreases as later step.

Such structure is effective in the case that the relationship between data outputted from each neuron is weak in the first and last step. A data processing system can be miniaturized by omitting the connection between neurons with no reflection to data processing.

FIG. 3 (b) shows the eighth embodiment. The data processing system does not comprise any neural cell but comprises neural layers from L1 to L8. Neurons in neural layer L1 are connected to only a part of neurons in neural layer L2. Likewise, neurons in neural layer L2 and in L3 are connected to a part of neurons in neural layer L3 and L4, respectively. The number of connectedness of neurons between each neural layers increases as later step, that is, toward neural layer L4 from L1. The neurons in neural layer L4 are connected to all the neurons in L5.

The neurons in neural layer L5 are connected to only a part of neurons in L6, and those in L6 are connected to only a part of neurons in L7. The number of connectedness of neurons between neural layers L6 and L7 is decreased from that between L5 and L6. Similar to it, neurons in neural layer L7 are connected to only a part of neurons in L8: the number of connectedness is less than that between neural layers L6 and L7. In the later steps after neural layer L5, the number of connectedness decreases as later step.

The structure in the eighth embodiment can also miniaturizes the data processing system by omitting the connection between neurons with no reflection to data processing in the case that the relationship between data to be outputted from each neuron is weak in the first and last step.

FIG. 3 (c) shows the ninth embodiment. The data processing system in this embodiment comprises neural cells from NC1 to NC4 in input side, from NC5 to NC8 in output side, and neural layers from L1 to L3 in the middle. Neural cells from NC1 to NC4 are connected to neural layer L1, and from NC5 to NC8 are connected to neural layer L3.

Neural cells are, different from the embodiment in FIG. 3 (a), connected to a part of neurons in another neural cell. Though the neurons in neural cells from NC1 to NC4 are separated completely from neurons in other neural cells in the first step, they are connected to a part of neurons in other neural cells in later step: the number of connectedness increases as later step. In the meantime, though neurons in neural cells from NC5 to NC8 are separated perfectly from neurons in other neural cells in the last step, they are connected to a part of neurons in other neural cells in previous steps: the number of connectedness increases as previous step.

Each neuron in neural layers from L1 to L3 is connected to all the neurons in adjacent neural layers. Each neuron in neural cell from NC1 to NC4 is connected to all the neurons in neural layer L1, and each neuron in neural cells from NC5 to NC8 is connected to all the neurons in neural layer L3.

Adopting this structure, the data processing system can be miniaturized by omitting the connections between neurons without reflection to data processing in the case that the relationship between neurons becomes closer as later step as to neural cells from NC1 to NC4 and it becomes weaker as later step as to neural cells from NC5 to NC8.

Figure 4A:
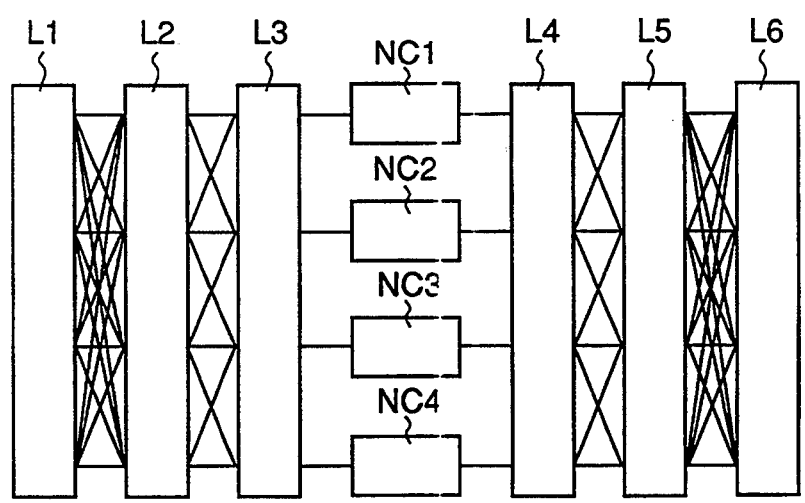
FIG. 4 (a) shows a diagram of the tenth embodiment of a data processing system.
Figure 4B:
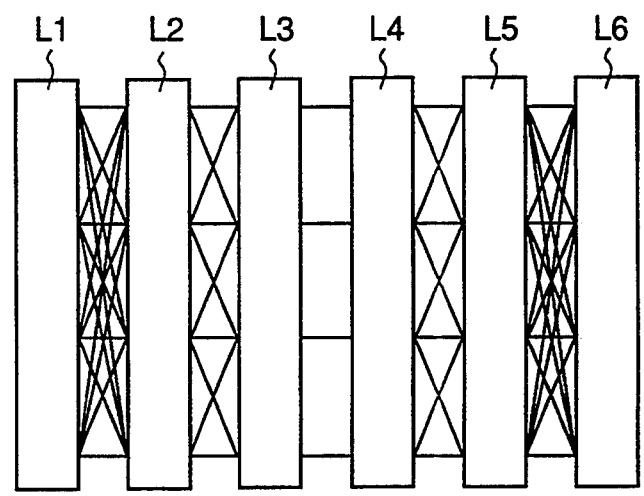
Figure 4C:
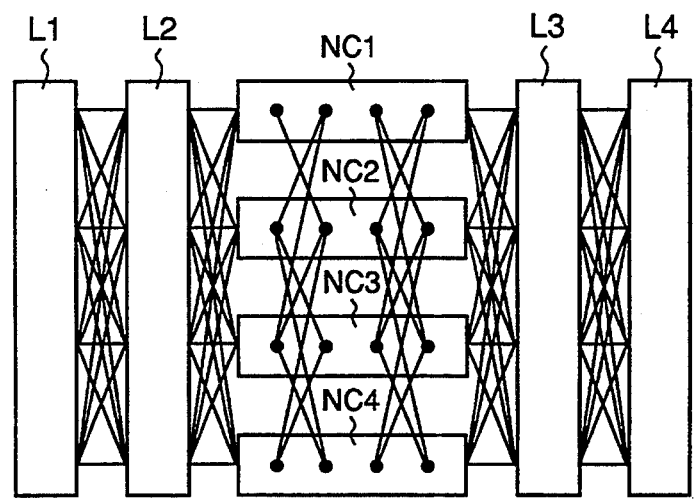

FIG. 4 (a) shows the tenth embodiment. The data processing system in this embodiment comprises neural layers from L1 to L3 input side, from L4 to L6 in output side, and neural cells from NC1 to NC4 in the middle. Neural layers L3 and L4 are connected to neural cells from NC1 to NC4.

The neurons in neural layer L1 are connected to all the neurons in neural layer L2, whose neurons are connected to only a part of neurons in neural layer L3. The number of connectedness is the largest between neural layers L1 and L2, and is the smallest between L3 and neural cells from NC1 to NC4. Namely, the number of connectedness of neurons decreases as later step within the limit from neural layer L1 to neural cells NC1 to NC4.

The neurons in the neural cells from NC1 to NC4 are connected to only a part of neurons in neural layer L4, whose neurons are also connected to only a part of neurons in neural layer L5. Comparing their number of connectedness, the one between neural layers L4 and L5 is the more. Each neuron in neural layers in L5 and L6 is connected to all the neurons in another layer between them. The number of connectedness of neurons increases as later step from neural cells of NC1, NC2, NC3 and NC4 to neural layer L6.

Neural cells from NC1 to NC4 are separated one another as in the seventh embodiment. Each neuron in them are not connected to the neurons in other neural cells.

In the present embodiment, the number of connectedness changes in neural layers in the middle between the first step and the last step.

Such structure can miniaturize a data processing system by omitting the connections between neurons without reflection to data processing in the case that the relationship between data to be outputted from each neuron is weak in the middle from the first step to the last step.

FIG. 4 (b) shows the eleventh embodiment. The data processing system in it does not comprise a neural cell but comprises neural layers from L1 to L6. The neurons in neural layer L1 are connected to all the neurons in neural layer L2. The neurons in neural layer L2 and L3 are connected to only a part of neurons in neural layer L3 and L4, respectively. The number of connectedness within the limit from neural layer L1 to L4 decreases as later step, that is, the nearer to L4, the less the number of connectedness is.

In the meantime, neurons in neural layer L4 are connected to only a part of neurons in neural layer L5: the number of connectedness increases more than that between neural layer L3 and L4. The neurons in neural layer L5 are connected to all the neurons in L6. The number of connectedness within the limit from neural layer L1 to L4 increases as later step.

The structure in the eleventh embodiment can miniaturize a data processing system by omitting the connection between neurons without reflections to data processing in the case that the relationship between data to be outputted from each neuron is weak in the middle between the first step and the last step.

FIG. 4 (c) shows the twelfth embodiment. The data processing system in this embodiment comprises neural layers L1 and L2 in input side, L3 and L4 in output side, and neural cells from NC1 to NC4 in the middle. The neurons in neural layer L1 are connected to all the neurons in neural layer L2, whose neurons are connected to all the neurons in neural cells from NC1 to NC4. In the same way, the neurons in neural cells from NC1 to NC4 are connected to all the neurons in neural layer L3, whose neurons are connected to all the neurons in neural layer L4. The neurons in neural cells from NC1 to NC4 are connected to only a part of neurons in other neural cells, differently from the embodiment in FIG. 4 (a). The neurons in neural cells from NC1 to NC4 are connected to a part of neurons in other neural cells in L2 side. The number of connectedness is the least in the middle: it increases in later step then that in the middle.

Adopting this structure, it is possible to miniaturize a data processing system by omitting the connections without reflection to data processing and controlling the number of connectedness to the minimum in the case that the relationship between neurons is weak as middle within the limits from neural cell NC1 to NC4.

There is another way to execute the embodiment in FIG. 4 (a). That is: extracting output data from neural cells NC1 to NC4, which are in the middle in the neural network, input them to other neural network.

Figure 5:
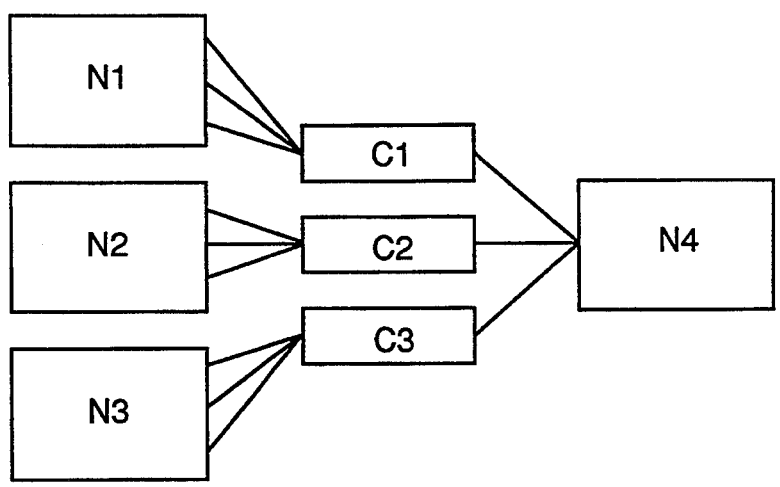
FIG. 5 is a diagram of an example showing the relationship among neural networks and neural cells.
Figure 6:
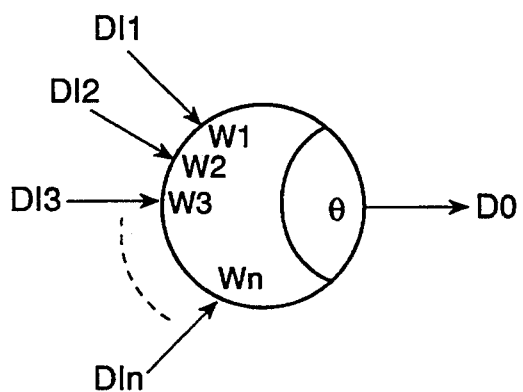
FIG. 6 shows a neural model.
Figure 7:
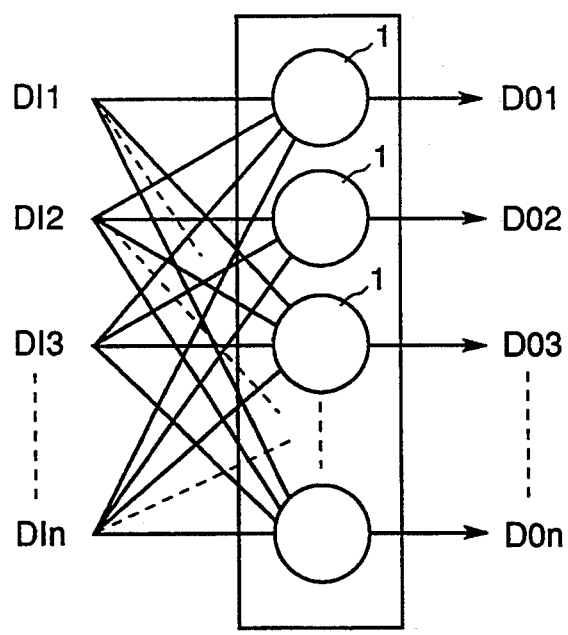
FIG. 7 shows an example of a neural layer.

FIG. 5 shows an embodiment in which neural cells are settled in the middle of plural neural networks. In this figure, the neurons in neural networks from the first to the third—that is, neural networks from N1 to N3—are connected to the neurons in the first to the third neural cells—that is, neural cells from C1 to C3—respectively. The neurons in neural cells from the first to the third—that is, neural cells from C1 to C3—are connected to the fourth neural network N4. In this embodiment, the neurons in each neural network are connected to all the neurons in adjacent neural layers. Neural cells from C1 to C3 are separated from each other, and the neurons in these are not connected to the neurons in other neural cells. Therefore, the number of connectedness becomes the minimum and data processing can be more effective.

As mentioned above, the data processing system relates to the present invention control the number of connectedness between neurons. This is not the one that neurons in the system and not connected to all the neurons in adjacent neural layer. Therefore, it is possible to miniaturize data processing system.

What is claimed is:
1. A data processing system comprising:
a plurality of neural layers each including a plurality of neurons from a first layer to at least one intermediate layer and a last neural layer, said first layer receiving an input data and processing said input data to transmit a processed result to the at least one intermediate layer, each intermediate layer receiving data processed by a previous layer to process said data and to output a data as a processed result, said last neural layer connected to receive data processed by previous layer so as to process said data and to output an output data,
wherein a plurality of groups of neurons are defined for each neural layer and a plurality of hexagonal-shaped neural cells including and plurality of neural layers are defined by said groups, and
wherein said input data is image data which is divided into a plurality of local areas of a hexagonal shape; and
means for performing hexagonal convolution image processing between said hexagonal shape input data and said plurality of hexagonal-shaped neural cells, further comprising a neural network connected to said last neural layer for receiving said output data so as to extract a resultant data from said output data.

2. A data processing system as claimed in claim 1, further comprising a neural network connected to said first neural layer for inputting said input data to said first neural layer.

3. A data processing system as claimed in claim 1, wherein data volume of said output data of each said neural cells is equal to data volume of said output data of other neural layers.

4. A data processing system as claimed in claim 3, wherein said neural network comprises a first neural layer having a plurality of neurons each of which receives all of said output data of said last layer.

5. A data processing system as claimed in claim 4, wherein each said plurality of neurons receiving said output data correspond to one of said neural cells, and are connected with all of the neural cells with a connection weight, wherein a connection weight value is a maximum value for the connection weight connected to the corresponding neural cell, has a negative value for the connection weight connected to the neural cells adjacent to said corresponding neural cell and increases in value for neural cells as distance from said corresponding neural cell increases.

6. A data processing system comprising:
a plurality of neural layers each including a plurality of neurons from a first layer to at least one intermediate layer and a last neural layer, said first layer receiving an input data and processing said input data to transmit a processed result to the at least one intermediate layer, each intermediate layer receiving data processed by a previous layer to process said data and to output a data as a processed result, said last neural layer connected to receive data processed by a previous layer so as to process said data and to output an output data,
wherein a plurality of groups of neurons are defined for each neural layer and a plurality of hexagonal-shaped neural cells including and plurality of neural layers are defined by said groups, and wherein said input data is image data which is divided into a plurality of local areas of a hexagonal shape; and means for performing hexagonal convolution image processing between said hexagonal shape input data and said plurality of hexagonal-shaped neural cells, further comprising a neural network connected to said first neural layer for inputting said input data to said first neural layer.

* * * * *